May 17, 1949.  R. DIARD  2,470,241
ROTARY HYDRAULIC FLUID TRANSMISSION MECHANISM
Filed March 29, 1948  2 Sheets-Sheet 1

INVENTOR.
Ray Diard
BY
*Glenn L. Fish*
ATTORNEY

May 17, 1949.  R. DIARD  2,470,241
ROTARY HYDRAULIC FLUID TRANSMISSION MECHANISM
Filed March 29, 1948  2 Sheets-Sheet 2

INVENTOR.
Ray Diard
BY
ATTORNEY

Patented May 17, 1949

2,470,241

UNITED STATES PATENT OFFICE 2,470,241

ROTARY HYDRAULIC FLUID TRANSMISSION MECHANISM

Ray Diard, Newport, Wash.

Application March 29, 1948, Serial No. 17,716

6 Claims. (Cl. 192—61)

1

The present invention relates to the general class of power plants of the type employing rotary fluid transmission mechanism in the nature of a combined fluid coupling and gearing, and more specifically to an improved rotary hydraulic power transmission mechanism which, while adapted for various purposes and uses, is especially designed to transmit power from a drive shaft to an axially alined driven shaft. As illustrated and hereinafter described, the drive shaft may be the motor-operated shaft of an automotive vehicle, and the driven shaft the propulsion shaft of the vehicle, in which the variable gear ratios between the drive shaft and the driven shaft are changed under different driving conditions of the vehicle.

The invention consists in certain novel features of construction and combinations and arrangements of parts involving a driving head and a driven rotor having a hydraulic transfer system and pumps therefor, together with planetary gearing between the driving head and the rotor, and speed responsive valve mechanism for the motive fluid transfer, as will hereinafter be described and more particularly set forth in the appended claims.

In the accompanying drawings I have illustrated a complete example of a physical embodiment of my invention wherein these parts are combined and arranged in accord with one mode I have devised for the practical application of the principles of my invention. It will, however, be understood that changes and alterations are contemplated and may be made in these exemplifying drawings and mechanical structures, within the scope of my claims, without departing from the principles of my invention.

Figure 1:
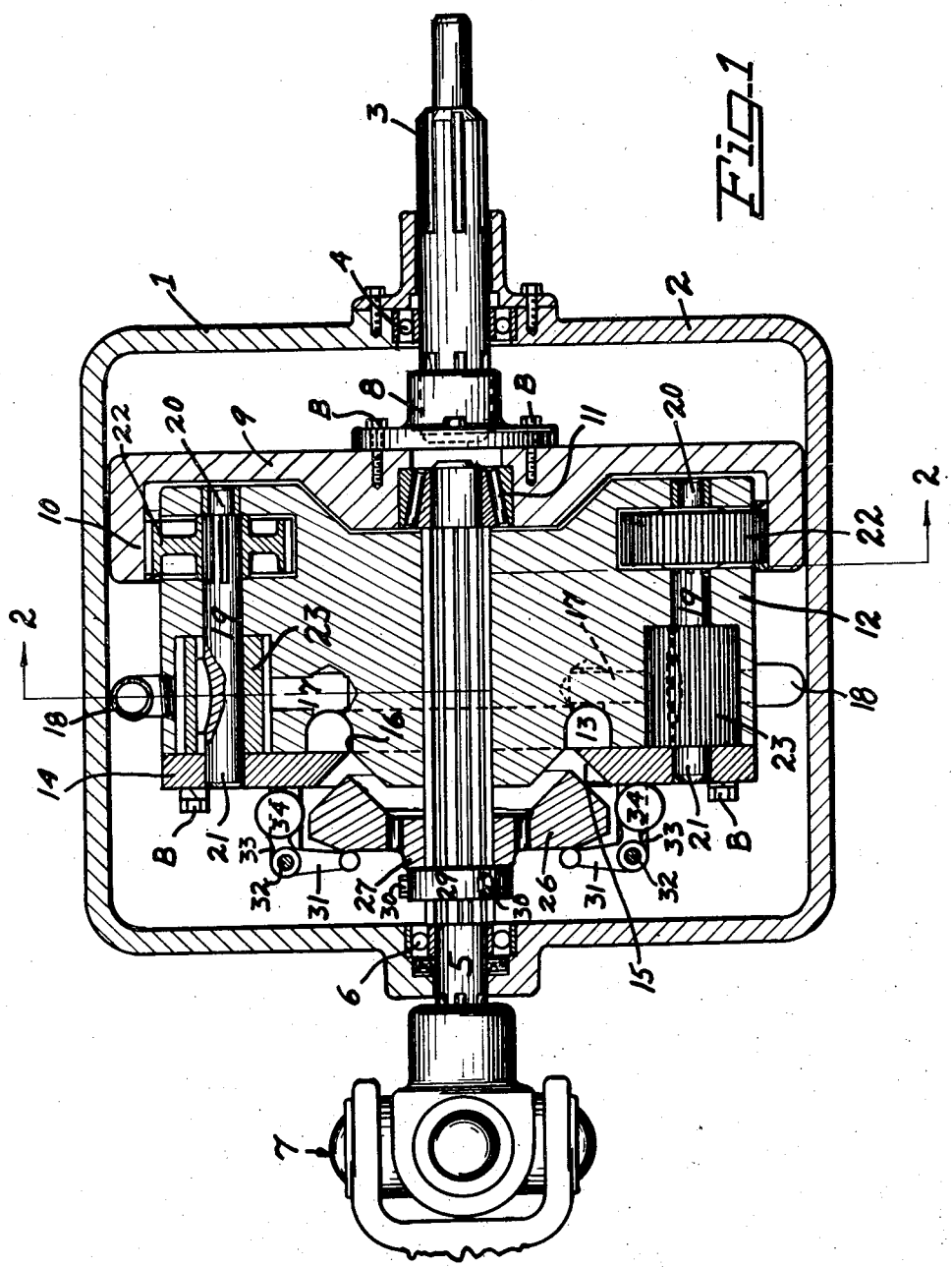
Figure 1 is a longitudinal vertical sectional view through a power transmission mechanism in which my invention is embodied.
Figure 3:
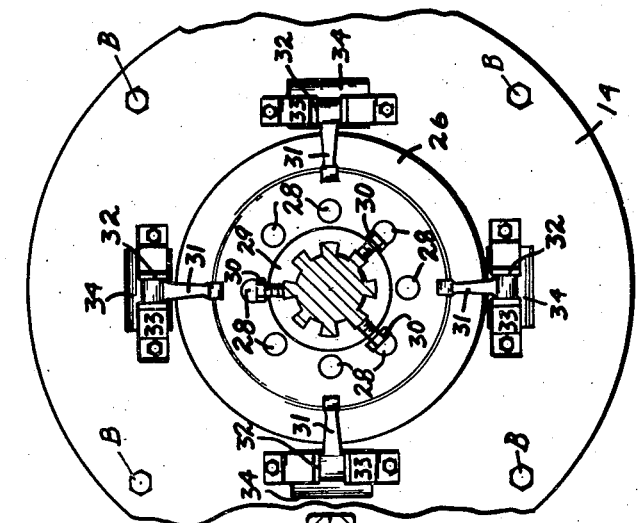
Figure 3 is a sectional view at line 3—3 of Fig. 1 within the housing showing the driven shaft, the rotor and the speed responsive centrifugally operated valve mechanism for the hydraulic system.
Figure 2:
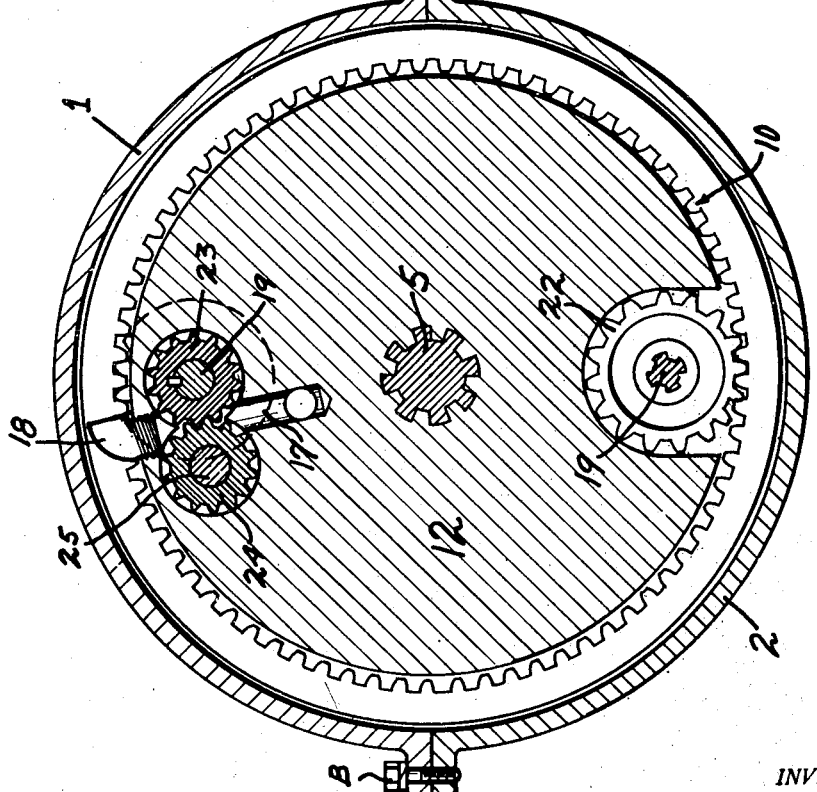
Figure 2 is a transverse vertical sectional view as at line 2—2 of Fig. 1.

For enclosing the operating parts of the transmission mechanism I employ a stationary sectional housing forming the motive fluid chamber and made up of flanged sections 1 and 2 that are bolted together as at B, B, in Fig. 2, and the chamber contains the usual quantity of fluid for use in the hydraulic parts of the transmission. At the right in Fig. 1 a typical drive shaft 3 receiving power from a suitable motor is journaled in ball bearings 4, and at the left of the figure

2 an axially alined driven shaft 5 is journaled in bearings 6 and coupled by an exterior universal joint 7 to the propulsion shaft of an automotive vehicle or other output shaft.

Within the fluid chamber the inner end of the drive shaft is attached by a flange joint 8 that is bolted at B to a circular disk or rotary driving head or impeller 9 which is equipped with an internal gear ring 10; and the inner end of the driven shaft 5 is journaled in a tapered roller bearing 11 mounted in the hub portion of the rotary driving head 9.

A cylindrical driven head or rotor 12 is splined on the driven shaft within the fluid chamber, and an outer face of the rotor is fashioned with an annular motive fluid reservoir 13, semi-circular in cross section, one side of the reservoir being almost, but not quite closed by a circular disk or valve plate 14, bolted at B to the face of the rotor.

The outer face of the valve plate is fashioned with a central tapered valve seat 15 having a minimum diameter that co-acts with the reservoir to form a restricted and fixed annular port 16 open from the reservoir into the valve seat, and controlled by a speed responsive centrifugally operated valve 26 as will be described.

The annular reservoir is provided with a number of radially arranged ducts as 17, here shown as two in number, and each terminating in an intake scoop 18 opening into the fluid chamber from the periphery of the rotor. Flow of motive fluid through the ducts is controlled by means of a pair of rotary gear pumps mounted within recesses or pump chambers within the rotor, and each pump is equipped with an operating shaft 19 disposed in a plane parallel with the longitudinal axis of the transmission mechanism, with one end journaled at 20 in the driving head, and its other end journaled at 21 in the valve plate 14. Each pump shaft is equipped with a pinion 22 located in a recess of the rotor in planetary relation to the internal gear 10 with which it is constantly meshed, and the pump shafts are thus rotated or revolved by the rotary driving head.

Each pump consists of a rotary operating gear 23 keyed to the pump shaft, and an idler gear 24 located in the pump chamber and mounted on its shaft 25 carried by the rotor and valve plate. The pump chamber intercepts the radial duct 17, and the open side of the chamber is closed by the inner face of the attached valve plate, in order that the motive fluid scooped by the intakes 18, 18, is forced through the gear pumps and the ducts into the reservoir in greater volume than the capacity of the port 16 to convey the fluid through the open valve seat into the fluid chamber.

The flow of fluid through the restricted port 16 is also controlled by a slide valve 26 having its hub 27 mounted on the splined driven shaft, which is responsive to speed of the driven shaft and centrifugally operated to control passage of fluid through the port 16. The slide valve is provided with an annular series of drain ports 28, and its opening movement is limited by a stop collar 29 secured on the driven shaft by set screws or bolts 30.

For centrifugal operation of the valve, a number (here shown as four) of bell crank levers 31 are pivoted at 32 in brackets 33 on the exterior face of the valve plate and surrounding the valve for co-action therewith, and each lever is equipped with a weight 34. In response to the rotary speed of the rotor and its valve plate, the weights are swung outwardly under centrifugal force and the levers push the valve toward closed position, the tapered valve thus moving into the tapered valve seat to close the port 16 and lock the rotor to the driving head by hydraulic means for conveying power and motion from the drive shaft to the driven shaft. With the cessation of centrifugal force the weighted levers are withdrawn from the valve, and the weights of the levers frictionally engage the tapered face of the valve as it is forced by fluid pressure from its seat to open the valve.

When the motor and drive shaft are idling port 16 is of sufficient volume capacity to permit flow of fluid from the pumps and reservoir to one end of the fluid chamber. With gradually increasing speed of the drive shaft the motor fluid pressure is backed up or set back to hydraulically couple the rotor to the driving head; and at high speed the centrifugally operated valve is closed against free flow of the motive fluid, the pumps are stopped, pinions 22 remain rigid with the internal gear of the drive head, and this rigid hydraulic and gearing connection transmits power or motion directly from the drive shaft to the driven shaft.

Having thus fully described my invention, what I claim as new and desire to secure by Letters Patent is:

1. In power transmission mechanism of the hydraulic and gearing type, the combination with a housing forming an interior motive fluid chamber, a drive shaft and an axially alined driven shaft journaled in the housing, a driving head within the housing and rigid with the drive shaft, and a rotor rigid with the driven shaft and having a motive fluid transfer system in communication with said chamber, of planetary gearing coupling the drive head with the rotor, a plurality of hydraulic pumps for said system within the rotor and actuated by said gearing, and speed responsive centrifugally operated valve mechanism carried by the rotor for controlling the motive fluid transfer system.

2. In power transmission mechanism of the hydraulic and planetary gearing type, the combination with a driving head having an internal gear ring, an axially alined rotor having a pinion co-acting with the gear ring, and a hydraulic system for the rotor, of a hydraulic gear pump carried by the rotor and actuated by the pinion to cause flow of motive fluid through the hydraulic system of the rotor, said rotor having a ported valve seat for the system, and a speed responsive centrifugally operated valve mechanism for closing said ported seat.

3. In power transmission mechanism of the hydraulic and planetary gearing type, the combination with a driving head having an internal gear ring, and an axially alined rotor having a pinion co-acting with the gear ring, said rotor having a fluid pump chamber and an intake thereto, an annular fluid reservoir connected with the chamber and a ported valve seat open to the reservoir, of a gear pump located in the chamber and actuated by said pinion, and a speed responsive centrifugally operated valve mechanism for closing the ported seat.

4. In a power transmission mechanism of the hydraulic and planetary gearing type, the combination with a drive shaft and its driving head having an internal gear ring, an axially alined driven shaft and a rotor thereon, and a pinion mounted in the rotor co-acting with the gear ring, said rotor having a motive fluid system including an annular ported valve seat, of a gear pump located in the system and actuated by said pinion, a slide valve rotatable with the driven shaft for closing the ported seat, and centrifugally operated means for closing the valve.

5. In power transmission of the hydraulic and planetary gearing type, the combination with a driving head having an internal gear ring, an axially alined driven shaft and a rotor thereon, and a pinion carried by the rotor and co-acting with the gear ring, said rotor having a motive fluid system including an annular ported valve seat, of a gear pump located in the system and actuated by the pinion, a slide valve rotatable with the driven shaft for closing the ported valve seat, and a plurality of centrifugally operated weighted bell-crank levers carried by the rotor for co-action with the valve.

6. In a power transmission mechanism of the hydraulic and planetary gearing type, the combination with a driving head having an internal gear ring, an axially alined driven shaft and a rotor thereon, said rotor having a hydraulic system including a pump chamber and intake thereto and a reservoir open to the chamber, and a pinion carried by the rotor and co-acting with the internal gear ring, of a gear pump located in the pump chamber and actuated by the pinion, a valve plate attached to the rotor closing the pump chamber and having an open valve seat co-acting with the reservoir to form a restricted port, a slide valve rotatable with the driven shaft, and speed responsive centrifugally operated means carried by the valve plate for sliding the valve to close the restricted port.

RAY DIARD.

REFERENCES CITED

The following references are of record in the file of this patent:

UNITED STATES PATENTS

| Number | Name | Date |
|---|---|---|
| 2,066,450 | Bascle et al. | Jan. 5, 1937 |
| 2,174,344 | Sinderson | Sept. 26, 1939 |
| 2,396,149 | Bock | Mar. 5, 1946 |